United States Patent
Taylor et al.

(10) Patent No.: US 7,654,567 B2
(45) Date of Patent: Feb. 2, 2010

(54) AIRBAG

(75) Inventors: Ian Taylor, Cheshire (GB); Alan Bradburn, Straffordshire (GB); Borje Jacobsson, Bramhult (SE); Ola Henriksson, Vargarda (SE); Anders Hagman, Surte (SE); Martin Lindsay, Cheshire (GB)

(73) Assignee: Autoliv Development AB, Vargarda (SE)

( * ) Notice: Subject to any disclaimer, the term of this patent is extended or adjusted under 35 U.S.C. 154(b) by 32 days.

(21) Appl. No.: 11/933,757

(22) Filed: Nov. 1, 2007

(65) Prior Publication Data

US 2008/0054612 A1   Mar. 6, 2008

Related U.S. Application Data

(63) Continuation of application No. PCT/EP2006/003892, filed on Apr. 27, 2006.

(30) Foreign Application Priority Data

May 4, 2005   (DE) .................. 10 2005 021 371

(51) Int. Cl.
  *B60R 21/026*   (2006.01)
  *B60R 21/021*   (2006.01)
(52) U.S. Cl. ..................... 280/740; 280/730.2
(58) Field of Classification Search .............. 280/740, 280/729, 730.2
  See application file for complete search history.

(56) References Cited

U.S. PATENT DOCUMENTS

| | | | | |
|---|---|---|---|---|
| 5,172,933 A | * | 12/1992 | Strasser | 280/740 |
| 5,938,233 A | * | 8/1999 | Specht | 280/730.2 |
| 6,086,092 A | * | 7/2000 | Hill | 280/729 |
| 6,273,456 B1 | * | 8/2001 | Heigl | 280/730.2 |
| 6,279,944 B1 | * | 8/2001 | Wipasuramonton et al. | 280/730.2 |

(Continued)

FOREIGN PATENT DOCUMENTS

EP   1 369 317   12/2003

(Continued)

OTHER PUBLICATIONS

Fabric Diffuser Panel for Air Bag Module. Research Disclosure. Mason Publications, Hampshire, GB. vol. 440, No. 115, Dec. 2000, XP007127300 ISSN: 0374-4353.

*Primary Examiner*—Paul N. Dickson
*Assistant Examiner*—Timothy Wilhelm
(74) *Attorney, Agent, or Firm*—Brinks Hofer Gilson & Lione

(57) ABSTRACT

An airbag having an airbag fabric skin (10) enclosing an interior gas space with a first edge (11) extending from a first end (11a) to a second end (11b), whereby an accommodation area (A) for a gas generator (20) is located at the first edge outside the gas spaced extending parallel the first edge (11), which exhibits an area (32) of a deflector element 930) which accommodates the gas generator. In order to ensure that the airbag unit consisting of gas generator and airbag halves in a thrust-neutral manner in case of a fire, deflector element (30) consists of a tubular, flexible element, whereby the deflector element (30) exhibits an upper and lower area (32, 36) whose lower area (36) is located inside the gas space (G). The deflector element is connected with the airbag skin in an intermediate area (34) which is located between upper and lower areas.

13 Claims, 4 Drawing Sheets

U.S. PATENT DOCUMENTS

| | | | |
|---|---|---|---|
| 6,334,625 B1* | 1/2002 | Pausch et al. | 280/729 |
| 6,371,518 B1* | 4/2002 | Kalandek et al. | 280/743.1 |
| 6,530,595 B2* | 3/2003 | Masuda et al. | 280/730.2 |
| 6,755,436 B2* | 6/2004 | Hess et al. | 280/730.2 |
| 6,811,184 B2* | 11/2004 | Ikeda et al. | 280/742 |
| 6,827,368 B2* | 12/2004 | Jang et al. | 280/729 |
| 6,834,884 B2* | 12/2004 | Gu | 280/729 |
| 6,860,507 B2* | 3/2005 | Uchiyama et al. | 280/730.2 |
| 6,945,556 B2* | 9/2005 | Maertens | 280/729 |
| 6,962,364 B2* | 11/2005 | Ju et al. | 280/730.2 |
| 7,040,652 B2* | 5/2006 | Ogata et al. | 280/730.2 |
| 7,401,805 B2* | 7/2008 | Coon et al. | 280/730.2 |
| 7,404,572 B2* | 7/2008 | Salmo et al. | 280/729 |
| 7,422,233 B2* | 9/2008 | Bradbum | 280/730.2 |
| 7,425,019 B2* | 9/2008 | Taylor et al. | 280/730.2 |
| 7,431,329 B2* | 10/2008 | Taguchi et al. | 280/729 |
| 7,458,606 B2* | 12/2008 | Charpentier | 280/730.2 |
| 2001/0019201 A1* | 9/2001 | Masuda et al. | 280/730.2 |
| 2002/0101066 A1* | 8/2002 | Tanase et al. | 280/730.2 |
| 2003/0047919 A1* | 3/2003 | Fujiwara | 280/730.2 |
| 2003/0090093 A1* | 5/2003 | Ikeda et al. | 280/730.2 |
| 2003/0160434 A1* | 8/2003 | Uchiyama et al. | 280/730.2 |
| 2004/0100077 A1* | 5/2004 | Ogata | 280/730.2 |
| 2004/0104561 A1 | 6/2004 | Maertens | |
| 2004/0188987 A1* | 9/2004 | Salmo et al. | 280/729 |
| 2006/0001244 A1* | 1/2006 | Taguchi et al. | 280/729 |
| 2006/0017267 A1* | 1/2006 | Fink | 280/730.2 |
| 2006/0108776 A1* | 5/2006 | Bradbum | 280/730.2 |
| 2006/0119084 A1* | 6/2006 | Coon et al. | 280/730.2 |
| 2006/0192369 A1* | 8/2006 | Taylor et al. | 280/730.2 |
| 2006/0255570 A1* | 11/2006 | Wipasuramonton et al. | 280/729 |
| 2007/0126220 A1* | 6/2007 | Huber et al. | 280/740 |
| 2007/0164546 A1* | 7/2007 | Kai et al. | 280/730.2 |
| 2007/0228701 A1* | 10/2007 | Yamamura | 280/730.2 |

FOREIGN PATENT DOCUMENTS

WO    WO 02/079008 A1    10/2002

* cited by examiner

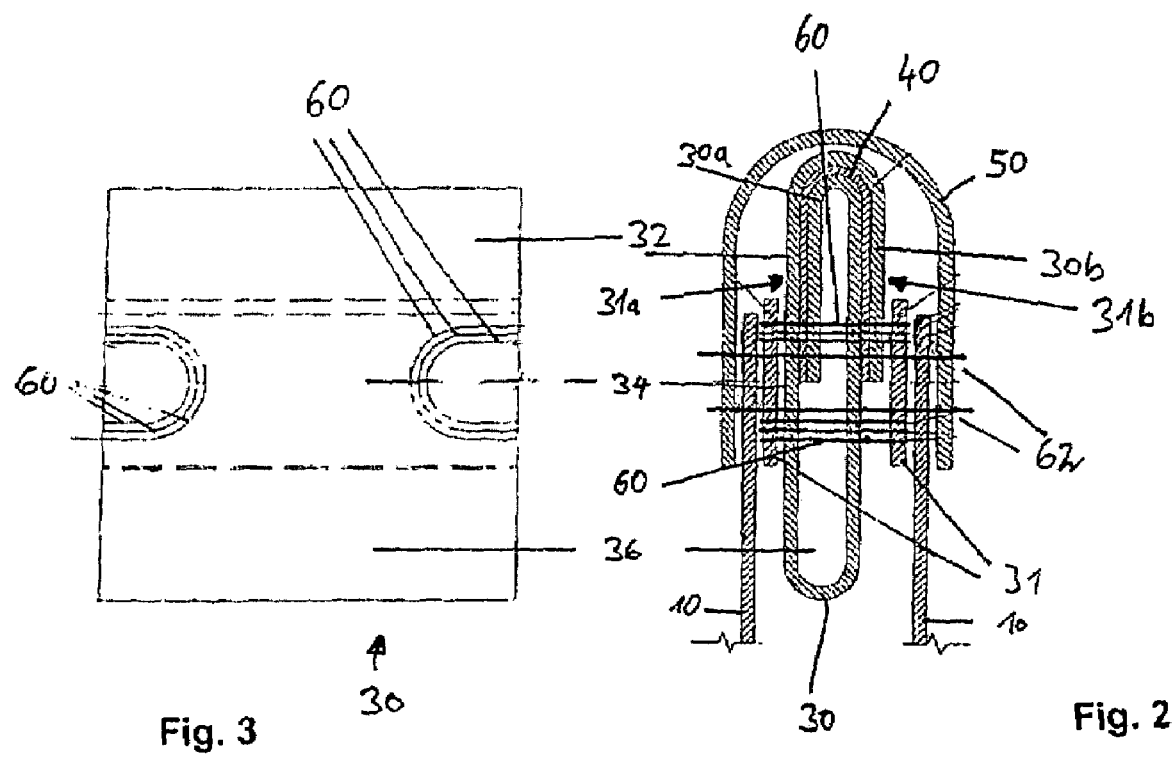
Fig. 3
Fig. 2
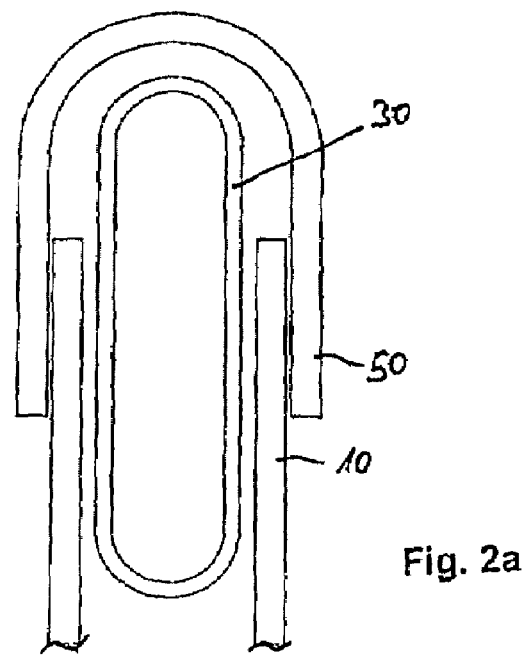
Fig. 2a

AIRBAG

CROSS REFERENCE TO RELATED APPLICATIONS

This application claims priority to DE 10 2005 021 371.5, filed May 4, 2005 and PCT/EP2006/003892, filed Apr. 27, 2006.

FIELD OF THE INVENTION

This invention relates to an airbag for a motor vehicle.

BACKGROUND OF THE INVENTION

A side curtain airbag unit has fabric layers forming an inflatable interior with a large surface and a gas generator for filing of the airbag interior. The airbag fabric has an upper edge which is fixed in the area of the roof rail of the motor vehicle, so that the longitudinal direction of the airbag extends along the longitudinal axis of the vehicle. The airbag must be filled with inflation gas from the gas generator from the upper edge. Two concepts are often used in this connection.

In the first concept, the gas generator is located at one of the two ends of the upper edge of the airbag (in most cases at the rear end) and a long, thin metal lance which forms several exit holes extends from the gas generator into the airbag interior and distributes the gas over the length of the airbag.

In a second concept, the airbag exhibits an accommodation area for the gas generator in the area of the upper edge between the front and the rear end. The gas generator extends into the airbag interior or is at least connected with the interior. For this purpose, the accommodation area can be L-shaped, for example.

Generally, cylindrical gas generators are used which are formed so as to be thrust-neutral for reasons of safety. This means that the gas exit openings are arranged rotation symmetrically on an area of the jacket surface of the gas generator. Thus, if an inflator is activated before it is assembled into an airbag system, the inflator will not behave like a rocket which could cause injury and damage. Without additional measures when the inflator is installed in the airbag, this would lead to the problem that the hot gases would stream directly against the airbag fabric and the airbag fabric would possible be damaged during inflation. Therefore deflectors are use, which protect the airbag fabric against the gas when it streams out.

Such a deflector is known from generic patent WO 02/079008 A1, and is in the form of a U-shaped metal sheet. Furthermore, this publication describes a gas guide element of fabric which is sewn into the airbag.

A disadvantage of such a deflector element is that when finally assembled, the airbag unit does not behave in a way which is thrust neutral in the case of a fire. If there should be a fire while the airbag assembly is in storage, the airbag skin consisting of plastic fabric burns, while the gas generator and the deflector element connected with the gas generator remain. In order to fulfill its purpose, namely the purpose of protecting the airbag fabric when the gas is streaming out, however, the deflector element must be construed asymmetrically. From this follows, however, that the subassembly consisting of gas generator and deflector does not behave in a thrust neutral manner. If a fire occurs while the airbag is stored, therefore, an additional hazard is presented by gas generator-deflector subassemblies flying around freely.

SUMMARY OF THE INVENTION

Starting from this it is the task of the invention to improve an airbag of the type generally described above in such a way that the thrust neutrality is also given in the complete airbag unit consisting of airbag and gas generator in case of fire.

The deflector element of the airbag unit according to this invention consists of a flexible, tube-shaped element. The thrust neutrality in case of a fire is often already ensured due to the resulting geometry. The flexible, tube-shaped element preferably consists of a material which in the case of relatively long exposure to heat, here relatively long is meant a period of time which is longer than the time it takes for the airbag to expand during a deployment through activating the inflator, and begins to burn or loses its strength. In other words, the deflector element preferably consists of a material which is not highly resistant to heat. This means that in case of fire, the deflector element burns away together with the airbag skin, or loses its strength, so that the gas from the generator which is itself thrust neutral can escape directly to the outside. The deflector element can be formed of a fabric material.

The tube-shaped deflector element can be folded from a one-piece or multipiece cutting of fabric, or it can be manufactured without seams, for example it can knitted in a tubular form. For the purposes of this application, fabric is taken to be any flexible basically two-dimensional material which can be cut and which does not consist of metal. The deflector element is arranged in relation to the airbag fabric is such a way that an upper area which is located outside the airbag interior and a lower area, which is located inside the airbag interior. The link with the airbag fabric results via an intermediate area between the upper and lower area. This means that the gas coming from the gas generator only comes into contact with the fabric of airbag skin at a late point, so that damage to the airbag skin is excluded.

Preferred forms of the invention can be derived from the subclaims as well as from the embodiments described below in more detail in connection with the drawings.

DETAILED DESCRIPTION OF THE INVENTION

The drawings are as follows:

FIG. 2 is a section along plane A-A from FIG. 1;

FIG. 2a is an alternative to that which is shown in FIG. 2;

FIG. 3 shows the deflector element from FIG. 1 with a side view;

DETAILED DESCRIPTION OF THE PREFERRED EMBODIMENTS

Figure 1:
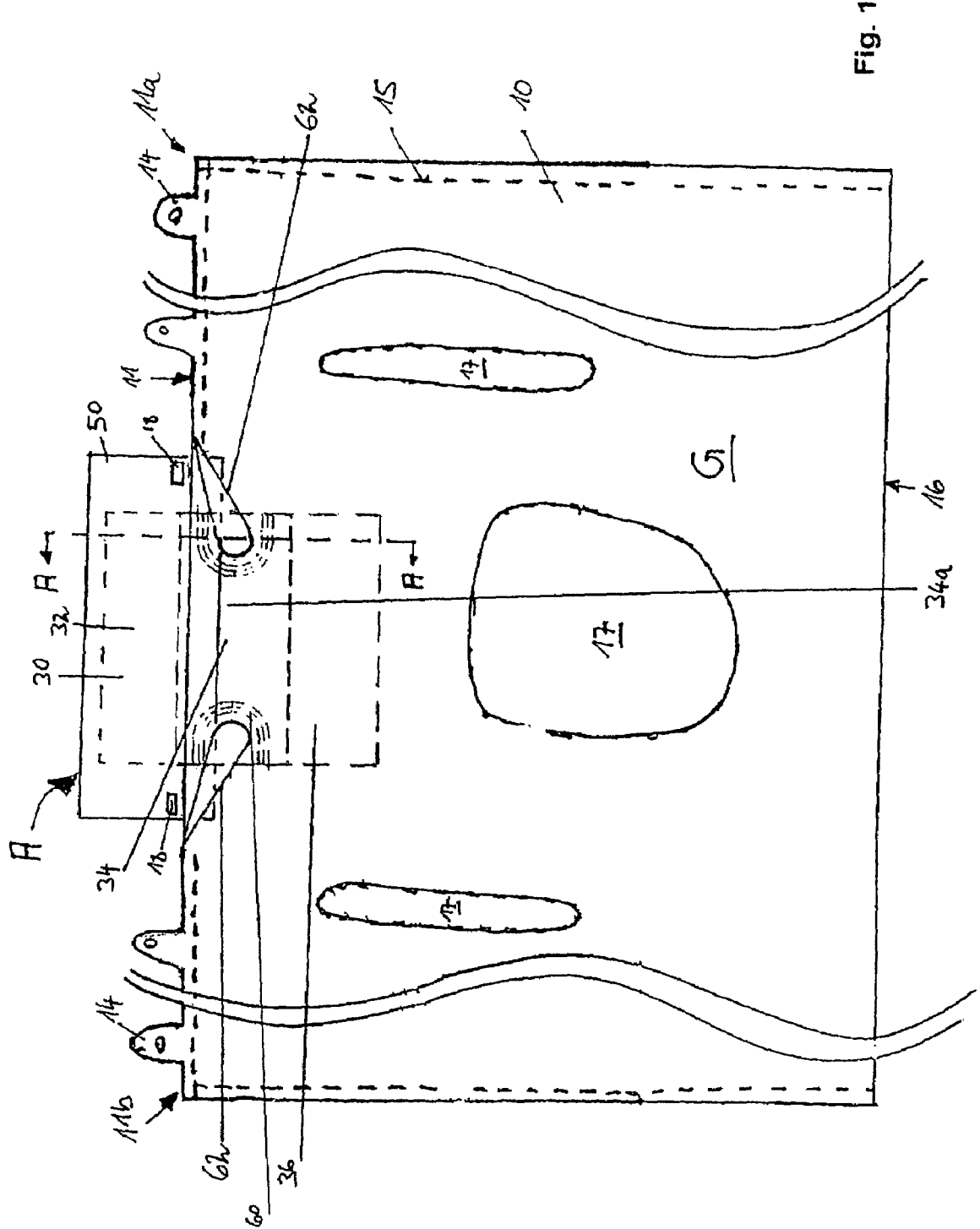
FIG. 1 is a side view of a curtain airbag according to this invention.

FIG. 1 shows a side view of a curtain airbag. The curtain airbag, referred to in the following text as airbag, exhibits airbag fabric skin 10, which is closed along circumferential seam 15 and folded edge 16 and thus surrounds the airbag interior gas space G. The first edge 11 extends from the first end 11a to the second end 11b and forms several fixing tabs 14. In the case of a curtain airbag, the first edge forms the upper edge 11. There are several non-inflatable areas 17 formed by seams, which serve for contouring of the airbag when deployed.

Figure 4:
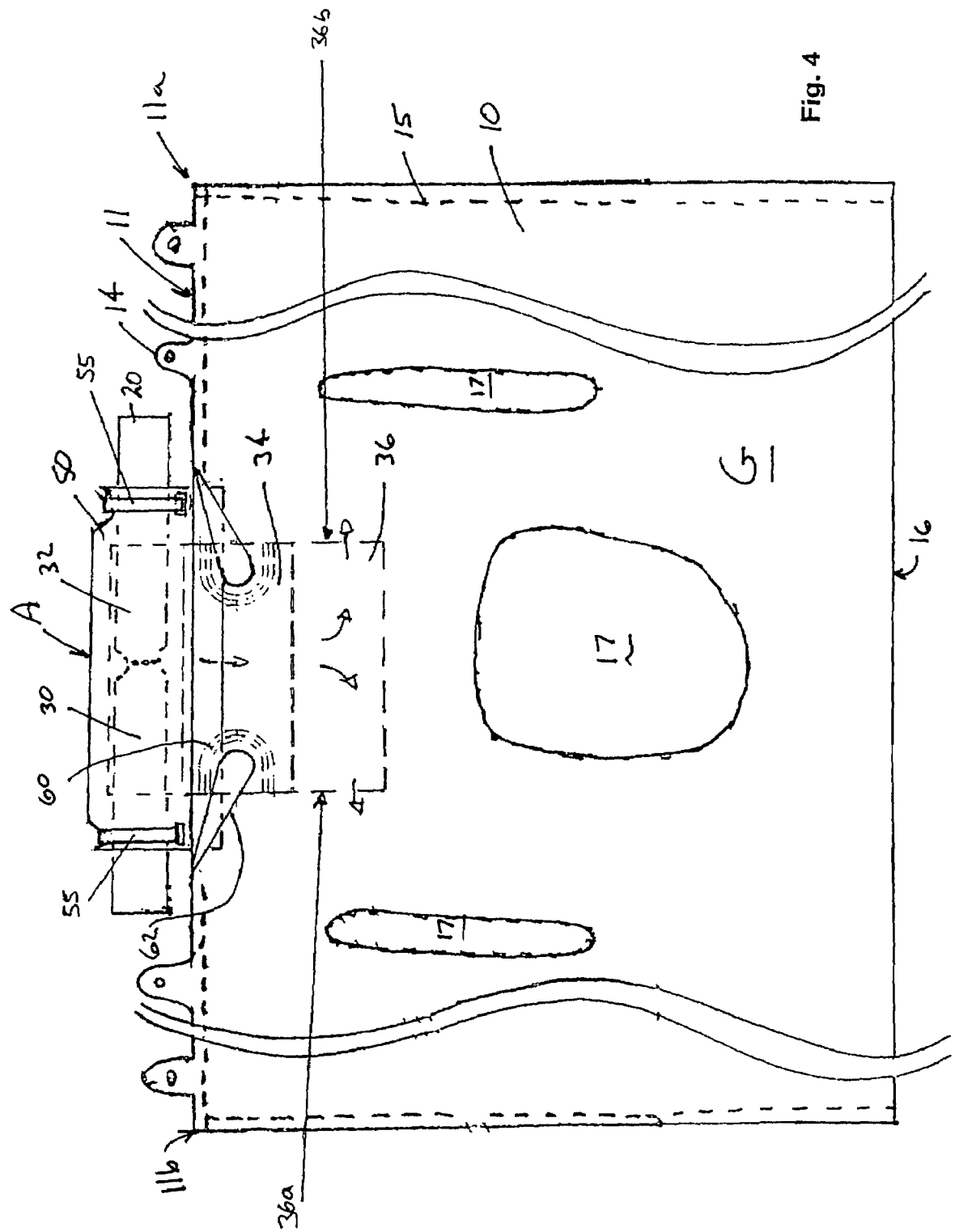
FIG. 4 shows the curtain airbag from FIG. 1 with the gas generator inserted.

Above the first edge 11 is located accommodation area A, which serves for the accommodation of a gas generator, which is located outside the gas space G. FIG. 4 shows the airbag with the gas generator 20. As accommodation area A is located outside gas space G, the gas streaming radially out of the jacket area of generator 20 must be guided into gas space G. Although accommodation area A communicates for gas flow with the airbag interior gas space G, it is characterized as outside gas space G, since it is separated from the main volume of gas space G, and is outside the perimeter outline of airbag fabric 10, with a narrow passageway connects accommodation area A with gas space G. Accommodation area A may also be described as separated from the gas space G. The deflector element 30 serves for the purpose of directing gas streaming from gas generator 20 and also for protection of the fabric of the airbag skin.

The structure of the deflector element 30 and its fixing to the airbag skin 10 is now described in more detail with reference to FIGS. 1, 2, and 3. The deflector element 30 consists of a piece of fabric and is folded to form a tube, whose longitudinal axis is generally parallel to the first edge 11. The piece of fabric overlaps itself in the upper area 32 of the deflector element 30, so that in this area of inner section 30a and outer section 30b are present, as can be seen from FIG. 2. Inner section 30a and outer section 30b are connected with each other by means of an adhesive layer 40. An increase in the resistance capability in this area is achieved by means of this adhesive layer 40. An increase in the resistance becomes useful here, as this area is placed under the greatest loading by the gases which stream out when gas generator 20 emits gas.

As can be seen in FIG. 1, deflector element 30 exhibits three areas, namely the upper area 32, the intermediate area 34 and the lower area 36. The upper area 32 is located outside (or separated from) the gas space G and above the upper edge 11. This upper area 32 accommodates the gas generator 20 directly. The upper area 32 is also surrounded by a further fabric area 50. Upper area 32 and further fabric area 50 therefore together form the accommodation area A. The further fabric area 50 in this embodiment is formed as a separate fabric element, but can also be made in one piece with the airbag skin. The further fabric area 50 has fixing openings 18, through which fixing clips 55 are guided, which clamp the further fabric area 50 onto the gas generator 20 (see FIG. 4). Alternatively, the fixing clips 55 can additionally be guided through fixing openings in the deflector element 30, preferably in the intermediate area 34.

The deflector element 30 extends from the upper area 32 into the gas space G of the airbag. In the lower area 36 gas coming from above is deflected to the left and right and leaves the lower area at the front sides 36a and 36b (FIG. 4). In the intermediate section 34, which is located between upper area 32 and lower area 36, deflector element 30 is connected to the airbag fabric skin 10. The two drop-shaped seams 62 which extend through all fabric layers serve for this purpose.

Furthermore, intermediate area 34 forms semicircular seams 60, which connect the right and left sides 31a, 31b of deflector element 30 with one another. By means of this, a narrowed overflow opening 34a is formed between upper area 32 and lower area 36. By means of this arrangement of the several semicircular seams 60, which only affect deflector element 30 and possibly a reinforcing layer, and which each surround the heads of the drop-shaped seams 62 in a semicircular manner, a very good sealing can be achieved. Furthermore, the all-through drop-shaped seams 62 are protected against the hot gases by the semicircular seams 60, which do not penetrate the airbag skin. Furthermore, in this embodiment, reinforcing layers 31 are arranged in the area of the semicircular seams (only visible in FIG. 2). Here it is particularly advantageous that when further fabric element 50, deflector element 30 and airbag skin 10 are sewn together, it is only necessary to apply the two drop-shaped seams 62.

The embodiment of the airbag described here does not exhibit any seams penetrating the airbag skin and which are directly blasted by gas from the gas generator 20, or which are hit by gases which hare still very hot. This considerably increases the sealing and reliability of the arrangement.

Embodiments are also possible which can do without a seam between the deflector element and the airbag skin. In this case it is particularly possible that the deflector element and airbag skin are only held together by the fixing clips already mounted.

Deflector element 30 in this embodiment is formed in one piece of cut fabric, however it can be joined together from several cuttings of fabric which can consist of different materials. For example, a more resistant type of material can be selected for inner section 30a, while outer section 30b can consist of a lighter and less costly type of fabric. These two sections can be sewn together at a first edge by means of a connecting seam, while a further connection is carried out by means of the adhesive method already mentioned. The connecting seam is preferably located in the lower area 36 of the deflector element 30, where the gas has already lost energy when it hits the walls.

FIG. 2a shows an alternative structure of the deflector element 30. Here, the deflector element is manufactured of a flexible material in the form of a seamless tube. In particular, it is possible to weave, knit or plait such a tube in a one-piece seamless form. One-piece manufacture of fabric tube is known, for example, from production of fire hoses. If the deflector element exhibits a seamless fabric tube, it can be useful to provide an internal tube made of an elastomer, or a coating in the inside of this fabric tube. It is also possible to extrude the deflector element in a one piece and seamlessly from an elastomer. The embodiment shown in FIG. 2a does not exhibit a reinforcing layer, however it is naturally possible to provide one in an embodiment with a seamless deflector element 30. The seams are not shown in FIG. 2a.

Figure 5:
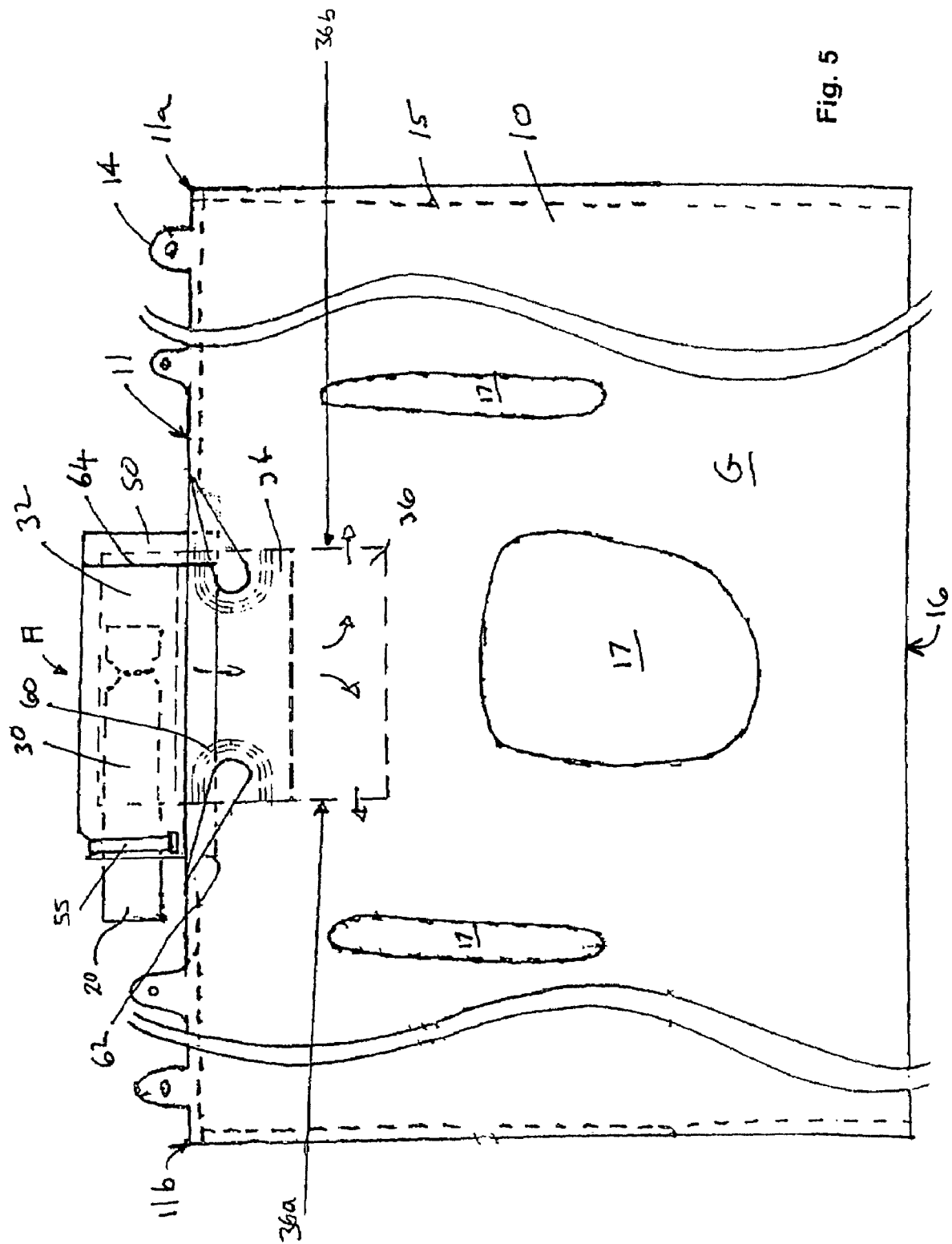
FIG. 5 is an alternative embodiment of a curtain airbag with inserted base generator in a view corresponding to FIG. 4.

FIG. 5 shows an alternative embodiment to the curtain airbag unit shown in FIG. 4. Here, gas generator 20 does not extend through accommodation area A, but only into it. A front-facing seam 64 is provided for sealing of the accommodation area A to the outside, which extends through further fabric area 50 and deflector element 30.

The invention was described here in connection of a side curtain airbag, but it can also be used in other airbags, for example side airbags. Depending on the mounting location of such a side airbag, it may be the area of the deflection element described here as "upper area" is not located above the gas space when mounted. Naturally this does not change the construction and mode of functioning of the airbag.

While the above description constitutes the preferred embodiment of the present invention, it will be appreciated that the invention is susceptible to modification, variation and change without departing from the proper scope and fair meaning of the accompanying claims.

The invention claimed is:

1. An airbag comprising:
   an airbag fabric skin enclosing a gas space, with a first edge extending from a first end to a second end, whereby an accommodation area for a gas generator is located adjacent the first edge separated from the gas space extending generally parallel to the first edge, the accommodation area having deflector element which accommodates the gas generator and directs the flow of gas emitted by the gas generator upon deployment of the airbag, the deflector element in the form of a tubular, flexible element having an upper area and a lower area that are each formed longitudinally across the tubular, flexible element and are separated from each other by an intermediate area, the lower area is located inside the gas space and the upper area is located outside the part of the airbag formed by the airbag fabric skin to receive the gas generator, the upper area of the deflector element is configured with a double wall so as to surround the gas generator directing the flow of the gas toward the lower area, and the deflector element is connected with the airbag fabric skin in the intermediate area that is located between the upper and lower areas, the intermediate area is sewn together with the airbag fabric skin, wherein one or more seams are arranged in the intermediate area of the deflector element by means of which a narrowed overflow opening is formed between the upper and lower areas, and the deflector element consists of a fabric material that is rolled to form a tube with overlapping fabric sections which form the double wall in the upper area but not in the lower area located inside the gas space.

2. An airbag according to claim 1, wherein the longitudinal axis of the deflector element is generally parallel to the first edge.

3. An airbag according to claim 1, wherein the intermediate area is clamped together with the airbag fabric skin by means of one or more fixing clips.

4. An airbag according to claim 1, wherein the deflector element is formed with the double wall only in the upper area.

5. An airbag according to claim 1, wherein the overlapping fabric sections are bonded together with an adhesive.

6. An airbag according to claim 1, wherein the one or more seams do not penetrate the airbag skin, and surround at least a portion of the seams which connect the deflector element with the airbag fabric skin.

7. An airbag according to claim 1, wherein at least one fixing clip is located in the intermediate area of the deflector element, through which a narrowed overflow opening is formed between the upper and lower area.

8. An airbag according to claim 7, wherein two fixing clips are present.

9. An airbag according to claim 1, wherein the upper area of the deflector element is surrounded by a further fabric area.

10. An airbag according to claim 1, wherein the airbag is a side curtain airbag and the first edge is an upper edge.

11. An airbag according to claim 1, wherein the gas generator is thrust neutral if initiated to generate the gas when the gas generator is separated from the airbag skin.

12. An airbag according to claim 11, wherein the deflector element is formed of a material which will burn when exposed to high temperatures for a relatively long period which is longer than a period of time which is required for the airbag to expand upon inflation by the gas generator.

13. An airbag according to claim 12, wherein the gas generator returns to thrust neutrality upon burning of the deflector element.

* * * * *